US008079715B2

(12) United States Patent
Garrigan

(10) Patent No.: US 8,079,715 B2
(45) Date of Patent: Dec. 20, 2011

(54) REFLECTED IMAGE THROUGH SUBSTANCE

(76) Inventor: Terrence M. Garrigan, Cincinnati, OH (US)

( * ) Notice: Subject to any disclaimer, the term of this patent is extended or adjusted under 35 U.S.C. 154(b) by 409 days.

(21) Appl. No.: 12/354,122

(22) Filed: Jan. 15, 2009

(65) Prior Publication Data
US 2009/0185142 A1      Jul. 23, 2009

Related U.S. Application Data

(60) Provisional application No. 61/022,138, filed on Jan. 18, 2008.

(51) Int. Cl.
*G03B 21/06* (2006.01)
(52) U.S. Cl. ............... 353/65; 353/50; 353/66; 359/616
(58) Field of Classification Search .................... 353/46, 353/50, 65, 66, 122; 359/228, 616, 617
See application file for complete search history.

(56) References Cited

U.S. PATENT DOCUMENTS

| | | | |
|---|---|---|---|
| 1,979,727 A | 11/1934 | Bennett et al. | |
| 3,841,010 A | 10/1974 | Ludwig | |
| 4,132,022 A | 1/1979 | Wood, Jr. | |
| 4,715,642 A | 12/1987 | Dobbs | |
| 4,919,517 A | 4/1990 | Jost et al. | |
| 6,608,608 B2 | 8/2003 | Kanamori | |
| 6,652,103 B2 | 11/2003 | Chiang | |
| 7,072,003 B2 | 7/2006 | Stahl et al. | |
| 2003/0081183 A1* | 5/2003 | Barnhurst | 353/46 |
| 2006/0007055 A1 | 1/2006 | Larson et al. | |
| 2006/0054887 A1 | 3/2006 | Kim et al. | |
| 2008/0034628 A1* | 2/2008 | Schnuckle | 40/310 |

FOREIGN PATENT DOCUMENTS

| | | |
|---|---|---|
| EP | 0216014 B1 | 1/1990 |
| EP | 0333502 B1 | 9/1994 |
| EP | 0975159 A2 | 1/2000 |

\* cited by examiner

*Primary Examiner* — Kevin Pyo
(74) *Attorney, Agent, or Firm* — Wood, Herron & Evans, LLP

(57) ABSTRACT

An apparatus and method to display an image are provided. The apparatus includes a reflective surface including an image disposed upon at least a portion of the reflective surface, an agitable and semi-transparent medium positioned over at least a portion of the reflective surface, a light source positioned to project light on the reflective surface through the medium, and a second surface positioned to capture light reflected from the reflective surface through the medium for displaying the image. The method of displaying the image includes disposing at least a portion of a reflective surface including an image beneath an agitable and semi-transparent medium, wherein the image is disposed upon at least a portion of the reflective surface, and providing light to the reflective surface such that a second surface captures light reflected from the reflective surface through the medium for displaying the image.

24 Claims, 4 Drawing Sheets

REFLECTED IMAGE THROUGH SUBSTANCE

CROSS-REFERENCE TO RELATED APPLICATIONS

This application is related to and claims the benefit of U.S. Provisional Patent Application Ser. No. 61/022,138 to Terrence M. Garrigan, entitled "REFLECTED IMAGE THROUGH SUBSTANCE" and filed on Jan. 18, 2008, which application is incorporated by reference herein.

FIELD OF THE INVENTION

The present invention relates to displaying an image, and more specifically to displaying light reflected from a reflective surface through a medium to display the image.

BACKGROUND OF THE INVENTION

It is often desired to project a viewpoint, message, information or other data through an image to achieve a purpose. For example, it is often desired to project an image to increase sales of a specific product, brand a particular location or otherwise incorporate an idea, symbol or information in the mind of a viewer. However, modern displays of images are generally becoming ever more costly as costs of the raw materials to display those images increase. Images may be printed on large static material, but those images may be ignored by a public that has increasingly shunned static displays in favor of those that offer interactivity. Projectors that provide an image, or other projection systems that project movement or other actions, however, are typically expensive to set up and require high maintenance as well as additional outlays to ensure the protection and continuing operation of those projectors.

Consequently, there is a need for an apparatus to provide interactivity with an image in such a manner that provides for low cost interactivity and that otherwise produces an aesthetically pleasing effect.

SUMMARY OF THE INVENTION

Embodiments of the invention provide for an apparatus that comprises a reflective surface including an image disposed upon at least a portion of the reflective surface, an agitable and at least semi-transparent medium positioned over at least a portion of the reflective surface, a light source positioned to project light on the reflective surface through the medium, and a second surface positioned to capture light reflected from the reflective surface through the medium for displaying the image.

Alternative embodiments of the invention provide for a method to display an image, the method comprising disposing at least a portion of a reflective surface including an image beneath an agitable and at least semi-transparent medium, wherein the image is disposed upon at least a portion of the reflective surface, and providing light to the reflective surface such that a second surface captures light reflected from the reflective surface through the medium for displaying the image.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

Figure 1A:
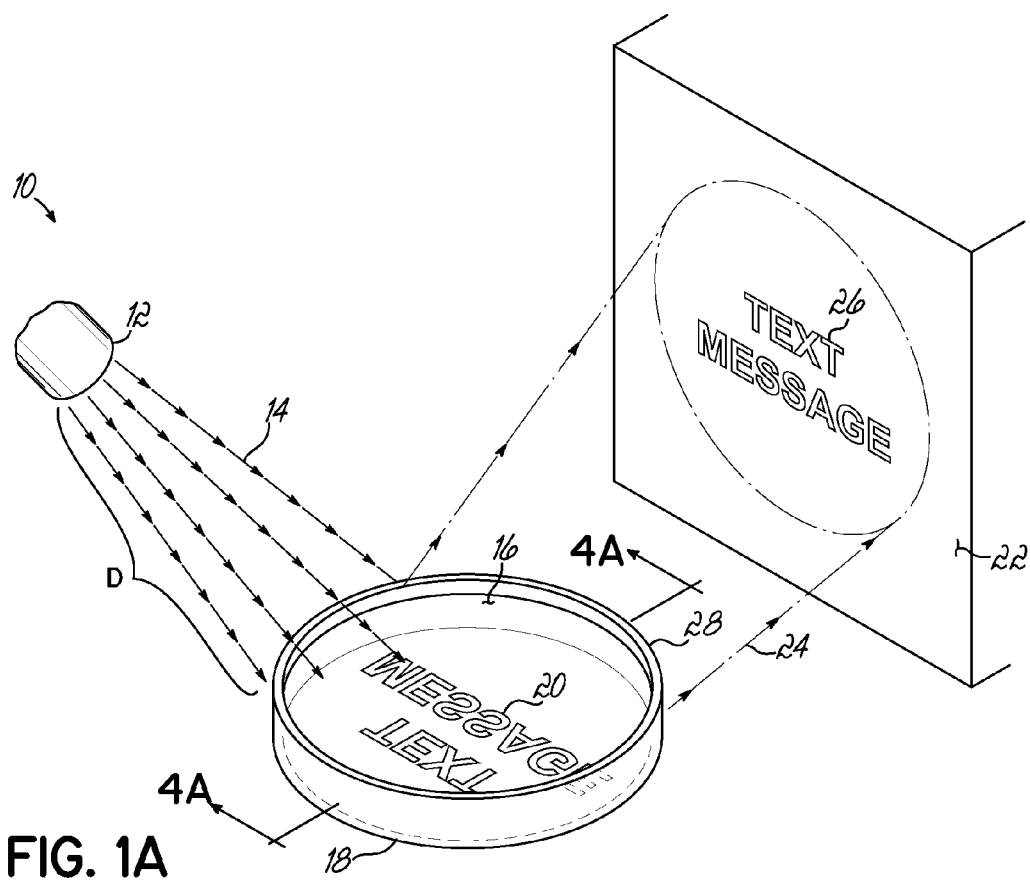
FIG. 1A is a diagrammatic illustration of an apparatus consistent with embodiments of the invention.

It should be understood that the appended drawings are not necessarily to scale, presenting a somewhat simplified representation of various features illustrative of the principles of the invention. The specific design features of embodiments of the invention as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Embodiments of the invention include an apparatus to display an image. The apparatus includes a reflective surface including an image disposed upon at least a portion of the reflective surface, an agitable and at least semi-transparent medium positioned over at least a portion of the reflective surface, a light source positioned to project light on the reflective surface through the medium, and a second surface positioned to capture light reflected from the reflective surface through the medium for displaying the image. In various embodiments, the medium may be a liquid medium or a solid medium, while the image may include text, a picture, and/or a symbol. The medium may also be a transparent medium or include a color component. Similarly, at least a portion of the image may include a color component. Additionally, in some embodiments the reflective surface is a mirrored surface. In some embodiments, the light source is positioned above the medium. Furthermore, in some embodiments a disturbance of the medium produces an aesthetically pleasing effect on the light reflected from the reflective surface, including an aesthetically pleasing effect on the light reflected from the reflective surface as the disturbance subsides.

Alternative embodiments of the invention include a method of displaying an image. The method includes disposing at least a portion of a reflective surface including an image beneath an agitable and at least semi-transparent medium, wherein the image is disposed upon at least a portion of the reflective surface, and providing light to the reflective surface such that a second surface captures light reflected from the reflective surface through the medium for displaying the image. In specific embodiments, the light may be provided by the sun, and providing the light to the reflective surface may include positioning the reflective surface and medium such that sunlight is reflected from the reflective surface through the medium and captured by the second surface to display the image. In some embodiments, the method further includes disturbing the medium to produce an aesthetically pleasing effect on the light reflected from the reflective surface through the medium, including producing an aesthetically pleasing effect on the light reflected from the reflective surface as the disturbance subsides. Additionally, the method may further include adjusting the depth of the medium to control the duration of a disturbance on the light reflected from the reflective surface through the medium, or adjusting the viscosity of the medium to control the duration of a disturbance on the light reflected from the reflective surface through the medium. In some embodiments, the light is provided by a light source, and the method may include adjusting the angle of the light source and/or adjusting the distance of the light source relative to the reflective surface. In various embodiments, the medium may be a liquid medium or a solid medium, while the image may include text, a picture, and/or a symbol. In some embodiments, at least a portion of the image includes a color component.

Turning to the drawings, wherein like numbers denote like parts throughout the several views, FIG. 1A is a diagrammatic illustration of an apparatus 10 consistent with embodiments of the invention. The apparatus 10 may include a light source 12 to project light as at 14, an agitable and at least semi-transparent liquid medium 16, a reflective surface 18 (at least partly shown in shadow) including an image 20 (at least partly shown in shadow) disposed upon at least a portion thereof, and a second surface 22 positioned to capture light reflected from the reflective surface 18 through the medium 16 as at 24 for displaying an inverted and mirror imaged reflection 26 of the image 20 (hereinafter, "reflected image" 26). In some embodiments, the light source 12 is a focusable light source with an intensity such that the light 14 from the light source 12 is capable of penetrating the medium 16, reflecting off the reflective surface 18, and being captured by the second surface 22. In alternative embodiments, the light source 14 is not focusable, and in specific embodiments the light source 14 is the sun. As illustrated in FIG. 1A, the medium 14 may be disposed in a container 28.

In some embodiments, the light source 12 is positioned at about a forty-five degree angle from the reflective surface 18 and is positioned at a distance "D" from the reflective surface 18. It is believed that an exemplary light source 12 includes one that cannot be focused into a beam, but one having skill in the art will appreciate that a light source capable of focusing light into a beam may be used without departing from the scope of the invention. Advantageously, by adjusting the distance D of the light source 12 from the reflective surface 18 the size and clarity of the reflective image 26 is adjusted. For example, it is believed that the size of the reflected image 26 is typically larger and more diffuse the further the light source 12 is from the reflective surface 18. Correspondingly, the size of the reflected image 26 is typically smaller and sharper the closer the light source 12 is to the reflective surface 18, up to the point at which the light 14 is reflected from a portion of the reflective surface 18 such that the reflected image 26 is displayed merely in part. Additionally, by adjusting the angle of the light source 12 to the reflective surface 18 the distortion of the reflected image 26 is adjusted. For example, it is believed that that the smaller the angle of the light source 12 to the reflective surface 18 (e.g., as the angle approaches zero degrees) the more the distortion and lengthening of the reflected image 26. Correspondingly, the larger the angle of the light source 12 to the reflective surface 18 (e.g., as the angle approaches ninety degrees) the less the distortion and lengthening of the reflective image 26. However, the larger the angle of the light source 12 to the reflective surface 18 the more likely that the reflected image 26 will not be displayed on the second surface 22. Advantageously, a range of angles from about twenty to about seventy degrees is believed to be a range of angles of the light source 12 to the reflective surface 18 that offer a suitable lack of distortion on the reflected image 26 while also offering a suitable display of the reflected image on the second surface 22. Advantageously, the range of angles may also be suitable to prevent interference from a container 28 holding the medium on the reflected image 26.

In some embodiments, the medium 16 is at least semi-transparent in regards to light (e.g., the medium 16 allows at least some incident light to pass through), and may be substantially transparent (e.g., the medium 16 allows substantially all incident light to pass through). Additionally, the medium 16 may be at least semi-translucent in regards to light (e.g., the medium 16 allows at least some incident light to pass through diffusely). As such, at least a portion of medium 16 may include a color component, such as a dye. In specific embodiments, the medium 16 is a liquid disposed within the container 28, and in further specific embodiments the medium 16 is water.

In addition to being at least semi-transparent and/or at least semi-translucent, the medium 16 is agitable. Specifically, the medium 16 is capable of being agitated, disturbed and/or actuated. For example, the medium 16 may be disturbed (e.g., agitated) by naturally occurring disturbances (e.g., the movement of air from wind, rain, fluidic movement from the effects of temperature on the medium 16, etc.) or induced disturbances (e.g., the movement of air from a fan creating wind or a person's breath, a faucet dripping drops of a liquid, a vibration, etc.).

In some embodiments, the reflective surface 18 is a surface capable of reflecting at least some light incident on that surface, and in specific embodiments the reflective surface 18 is a mirror. In turn, the image 20 may be created by configuring an at least semi-opaque (e.g., blocking at least some incident light) and/or an at least semi-translucent material (e.g., diffusing at least some incident light) to the reflective surface 18 through labeling, etching, texturing, and/or some other method of affixing. In specific embodiments, the image 20 is created by affixing non-reflective material to the reflective surface 18. In alternative specific embodiments, the image 20 is created by affixing a semi-transparent and/or semi-translucent material to the reflective surface 18. Throughout the embodiments, the material used to create the image 20 may include a color component such that the reflected image 26 includes a color component. Also throughout the embodiments, at least a portion of the image 20 may be elongated and/or shortened to account for the distortion caused by the angle of light 14 from the light source 12 to the reflective surface 18. Thus, the reflected image 26 includes light 24 reflected from the reflective surface 18 that is not otherwise absorbed or blocked by the image 20. It will be appreciated that the image 20 may not include the semi-transparent and/or semi-translucent material, and that instead may be formed by the affixation of said material(s) to the reflective surface. Thus, the reflected image 26 may instead include light 24 reflected from the image 20 that is not otherwise absorbed or blocked by the material. As illustrated in FIG. 1A, the image 20, and thus the reflected image 26, includes text.

Figure 1B:
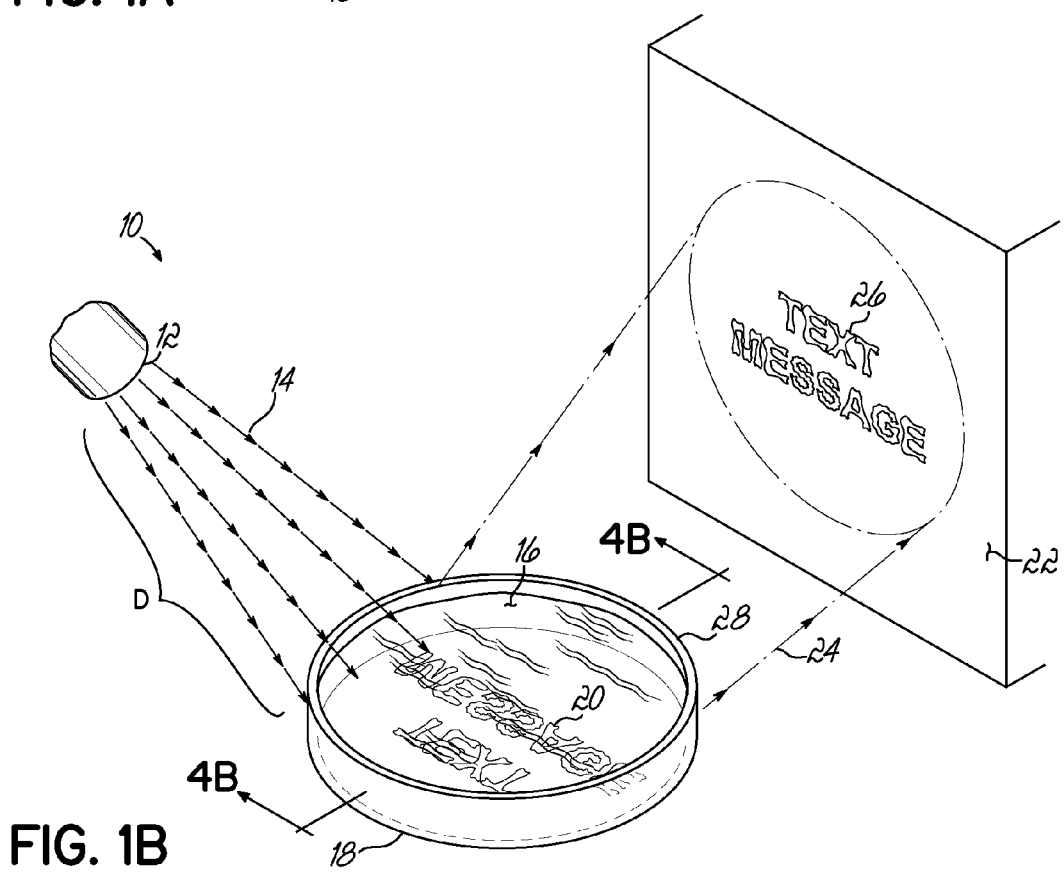
FIG. 1B is a diagrammatic illustration of the effects of a disturbance on a liquid medium of the apparatus of FIG. 1A.

FIG. 1B is a diagrammatic illustration of the apparatus 10 of FIG. 1A demonstrating the effect a disturbance on the medium 16 has on the reflected image 26. As illustrated, the medium 16 may be a liquid and disturbed by the movement of air. This, in turn, causes a disturbance in the refraction of light as it reaches the boundary of the medium 16 before it is reflected, and as it reaches the boundary of the medium 16 after it is reflected from the reflective surface 18. Accordingly, the disturbances in the medium 16 result in disturbances in the refraction of light from the medium 16, thus resulting in distortion of the reflected image 26 to produce an aesthetically pleasing effect on the reflected image 26. In particular, an aesthetically pleasing effect is produced not only by the disturbance of the reflected image 26, but also by the transition as the disturbance subsides. Thus, the aesthetically pleasing effect occurs not just with the transition of the apparatus 10 in regards to a disturbance as illustrated in a transition from FIG. 1A to FIG. 1B, but also in the transition of the apparatus 10 in regards to the calming of the disturbance as illustrated in a transition from FIG. 1B to FIG. 1A. It is believe that the transition of the apparatus 10 in regards to the calming of the disturbance as illustrated in the transition from FIG. 1B to FIG. 1A produces a calming effect upon a viewer.

Figure 2:
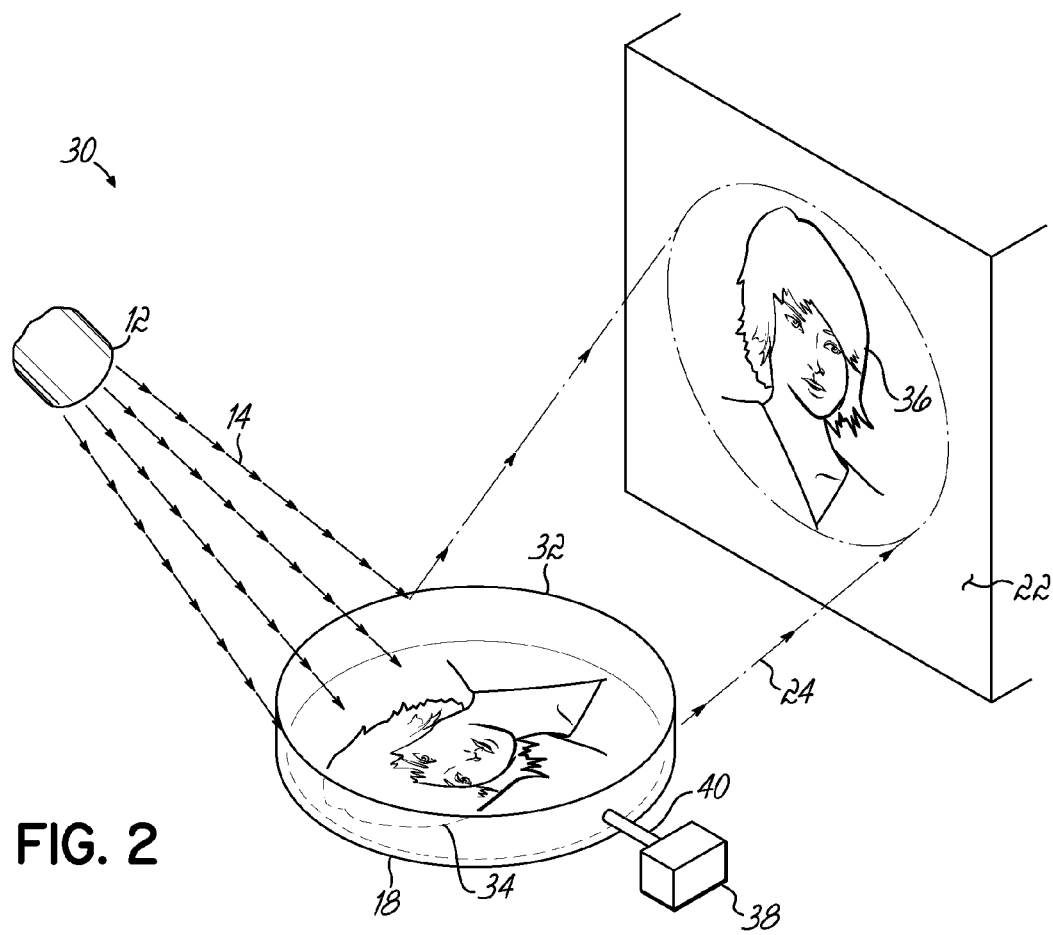
FIG. 2 is a diagrammatic illustration of an alternative embodiment of an apparatus that includes a solid medium consistent with embodiments of the invention.

FIG. 2 is a diagrammatic illustration of an alternative embodiment of an apparatus 30 consistent with embodiments of the invention. The apparatus 30 illustrated in FIG. 2 may include a light source 12 to project light as at 14, an agitable and at least semi-transparent solid medium 32, a reflective surface 18 including an image 34 disposed upon at least a portion thereof, and a second surface 22 positioned to capture light reflected from the reflective surface 18 through the medium 32 as at 24 for displaying an inverted and mirror imaged reflection 36 of the image 32 (hereinafter, "reflected image" 36). The medium 32 in apparatus 30 may be agitated, or otherwise disturbed, by a motor 38 in communication with the medium through a member 40. Specifically, the motor 38 may control the medium 32 to induce a distortion on the reflected image 36 and produce an aesthetically pleasing effect on the reflected image 36. Additionally, the medium 32 in apparatus 30 may include a non-uniform surface, and thus be a disturbed surface, to result in a distortion of the reflected image 36 and produce an aesthetically pleasing effect on the reflected image 36. Furthermore, similarly to the medium 16 illustrated in FIG. 1A and FIG. 1B, the medium 32 illustrated in FIG. 2 may include a color component. Alternately, the image 32 may include a color component.

Figure 3:
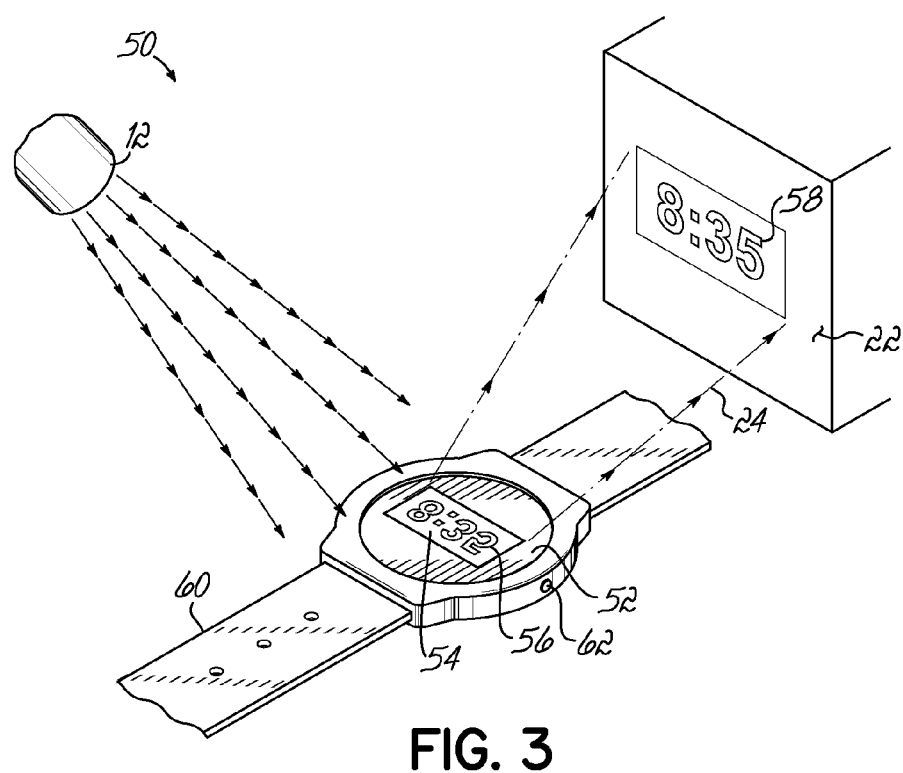
FIG. 3 is a diagrammatic illustration of an alternative embodiment of an apparatus to convert a wrist-watch into a clock consistent with embodiments of the invention.

FIG. 3 is a diagrammatic illustration of a further alternative embodiment of an apparatus 50 consistent with embodiments of the invention. The apparatus 50 may include a light source 12 to project light as at 14 towards at least one agitable and at least semi-transparent solid medium 52, a reflective surface 54 including an image 56 disposed upon at least a portion thereof, and a second surface 22 positioned to capture light reflected from the reflective surface 54 through the medium 52 as at 24 for displaying an inverted and mirror imaged reflection 58 of the image 56 (hereinafter, "reflected image" 58). As illustrated in FIG. 3, a chronological device, such as a watch 60, may comprise the at least one medium 52, the reflective surface 54 and the image 56. In particular, the at least one medium 52 may include a glass substrate that is agitable by the electronics of the watch 60 to turn at least a portion of that substrate opaque, thus resulting in an image 56 in the watch. As such, the watch 60 may be a liquid-crystal display of the type that includes at least one agitable and at least semi-transparent medium 52 (e.g., in some embodiments, the glass substrate responsive to electronic disturbance to turn at least a portion of that medium opaque and form the image 56) and a reflective surface 54. In specific embodiments, the watch 60 is configured to display, in response to a press of a button 62, an image 56 such that the reflected image 58 displays a time. In this manner, by placing the watch 60 such that light 14 from the light source 12 is reflected on the reflective surface 54, the watch 60 may provide the reflected image 58 as a wall clock on the second surface 22.

Figure 4A:
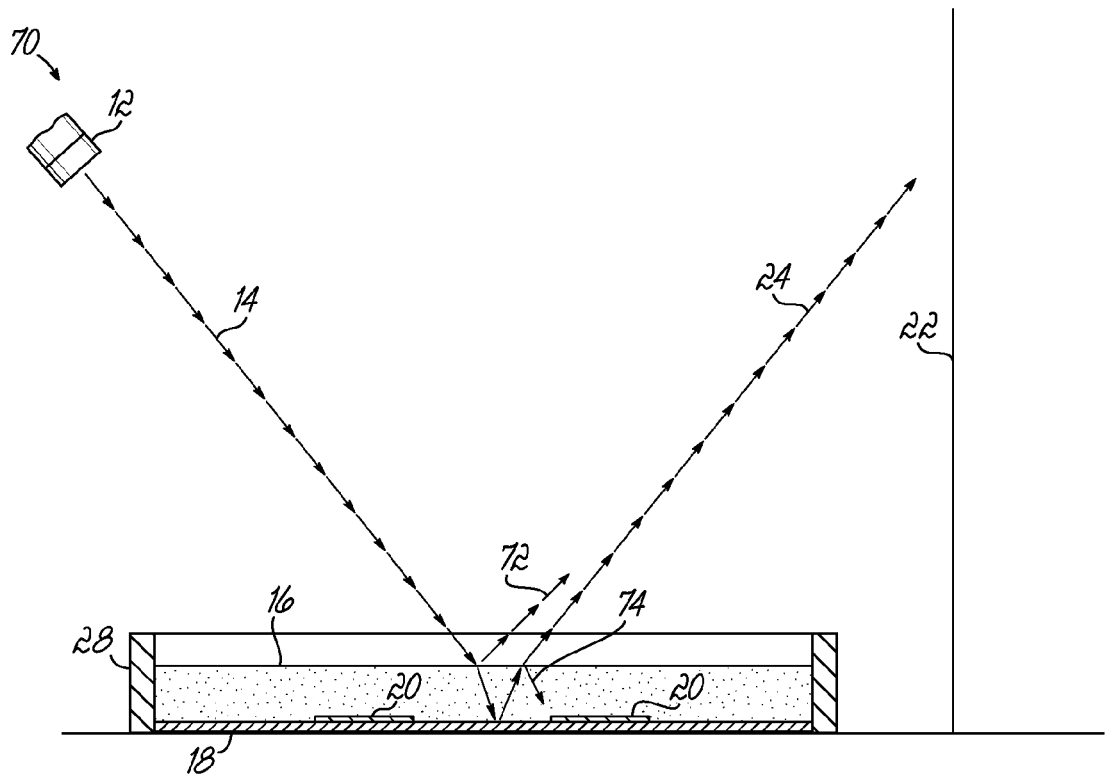
FIG. 4A is a perspective illustration of reflection and refraction in the apparatus of FIG. 1A.

FIG. 4A is a simplified perspective illustration 70 of the apparatus 10 of FIG. 1A demonstrating the transmission of light through the medium 16. In particular, FIG. 4A illustrates that the light 14 from the light source 12 initially refracts through the surface of the medium 16 (with some light 14 totally reflecting from the surface of the medium 16 and away from the reflective surface 18 as at 72) and is then reflected from the reflective surface 18 through the medium 16 and again refracted through the surface of the medium 16 (with some light totally reflecting from the surface of the medium 16 and towards the reflective surface 18 as at 74). The light reflected from the reflective surface 18 and through the medium 16 as at 24 is captured by the second surface 22 to display the reflected image 26.

Figure 4B:
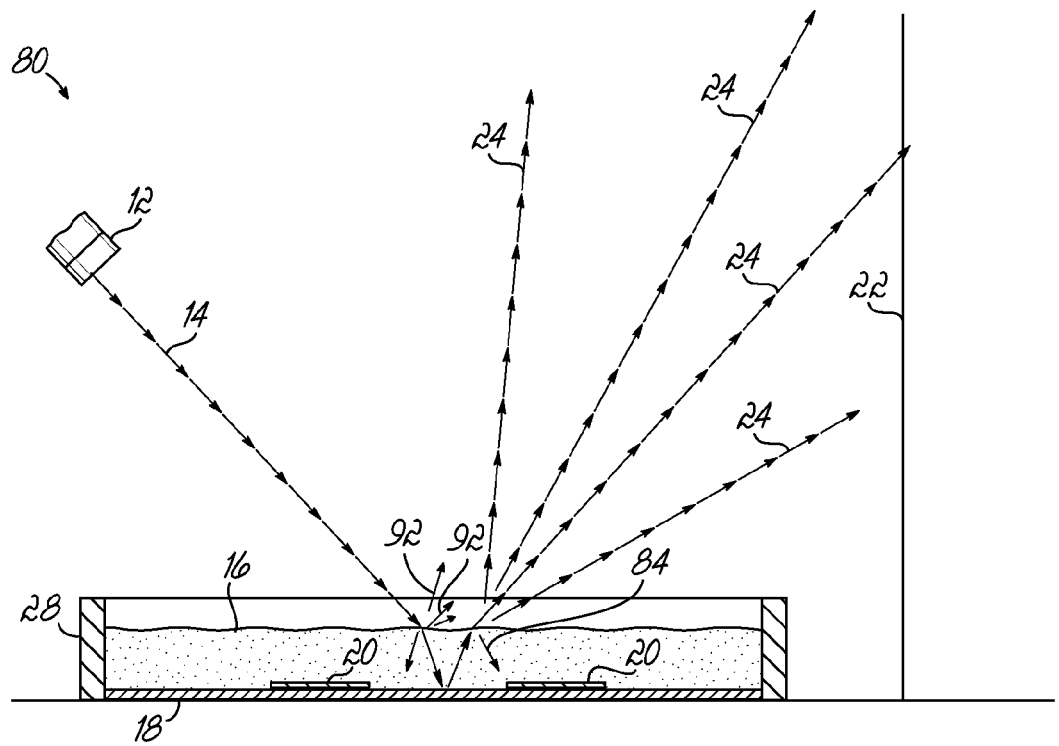
FIG. 4B is a perspective illustration of reflection and refraction in the apparatus of FIG. 1B.

FIG. 4B is a simplified perspective illustration 80 of the apparatus 10 of FIG. 1B demonstrating the transmission of light through the disturbed medium 16. In particular, FIG. 4B illustrates that the light from the light source 12 initially refracts through the surface of the medium 16 (with some light 14 totally reflecting from the surface of the medium 16 and away from the reflective surface 18 as at 82) and is then reflected from the reflective surface 18 through the medium 16 and again refracted through the surface of the medium 16 (with some light totally reflecting from the surface of the medium 16 and towards the reflective surface 18 as at 84). However, due to the disturbance of the medium 16, the light reflected from the reflective surface 18 and through the medium 16 as at 24 is also disturbed and captured by the second surface 22, thus resulting in distortion of the reflected image 26 to produce an aesthetically pleasing effect on the reflected image 26.

Figure 5:
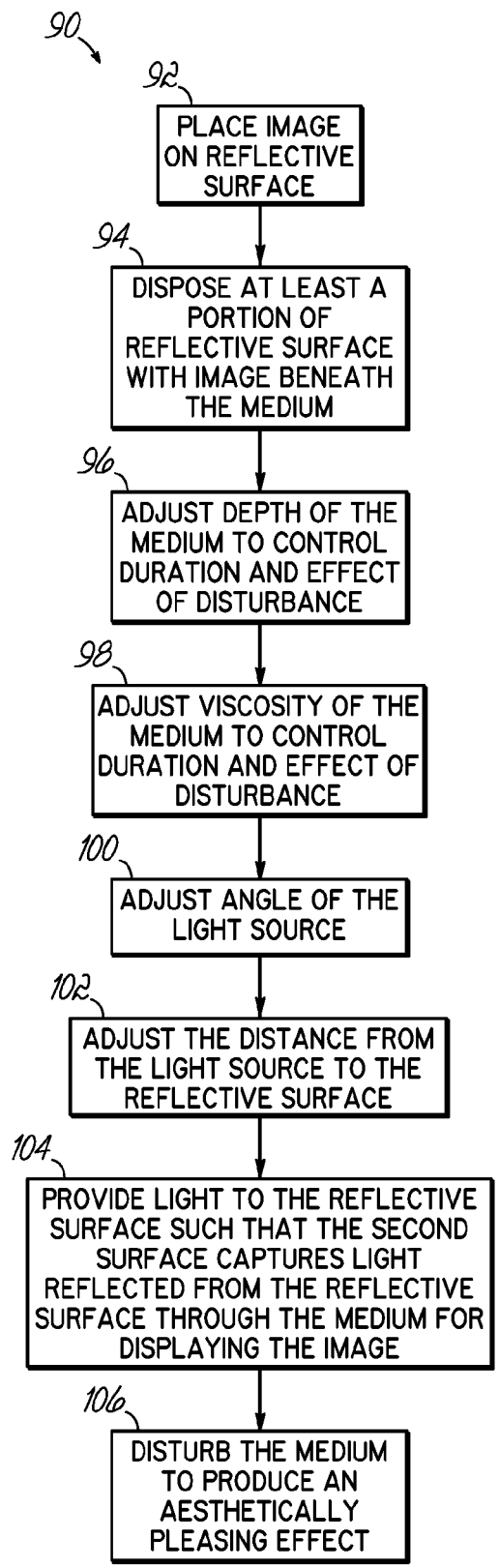
FIG. 5 is a flowchart illustrating blocks of a process to configure and adjust the apparatus of FIGS. 1A, 1B, 2 and 3.

Throughout the embodiments, it may be desirable to adjust the depth of the medium, adjust the viscosity of the medium, disturb the medium, adjust the angle of the light source and/or adjust the distance of the light source from the reflective surface. FIG. 5 illustrates a flowchart 90 to configure an apparatus, as well as adjust an apparatus, consistent with embodiments of the invention. In block 92, an image may be placed on a reflective surface. In some embodiments, this may include placing text, a picture, and/or a symbol on the reflective surface. In block 94, at least a portion of the reflective surface is disposed beneath an agitable and at least semi-transparent medium. Specifically, it will be appreciated that the reflective surface may be completely disposed beneath the agitable and at least semi-transparent medium when that medium is a solid medium, and that the reflective surface may be merely partially disposed beneath (e.g., disposed beneath the surface of, but otherwise located in) the agitable and at least semi-transparent medium when that medium is a liquid medium. In an optional step in block 96, the depth of the medium may be adjusted to control the duration and effect of a disturbance. Specifically, if the medium is a liquid, it is believed that reducing the depth of the medium reduces the time for that medium to return to steady state after the disturbance, reduces the intensity of the effect of the disturbance, and/or reduces the time for the disturbance to subside. Thus, it may be desired to adjust the depth of the medium to control the duration and effect of a disturbance on the light reflected from the reflective surface through the medium. In specific embodiments, the depth may be adjusted by adding or removing liquid medium.

Moreover, in an optional step in block 98, the viscosity of the medium may be adjusted to control the duration and effect of a disturbance. Specifically, if the medium is a liquid, it is believed that increasing the viscosity of the medium reduces the time for that medium to return to steady state after the disturbance, reduces the intensity of the effect of the disturbance, and/or reduces the time for the disturbance to subside. Thus, it may be desired to adjust the viscosity of the medium to control the duration and effect of a disturbance on the light reflected from the reflective surface through the medium. In specific embodiments, the viscosity of the medium is adjusted by adding a thickening agent (e.g., such as gelatin, glycerin, agar, etc.) to make the medium more viscous or adding more liquid medium to make the medium less viscous. The thickening agent may include a color component.

In an optional step in block 100, the angle of the light source may be adjusted to control the distortion of the image in the light reflected from the reflective surface through the medium. Moreover, in an optional step in block 102, the distance from the light source to the reflective surface may be adjusted to control the clarity and intensity of the image in the light reflected from the reflective surface through the medium. In block 104, light may be provided to the reflective surface such that the second surface captures light reflected from the reflective surface through the medium for displaying the image. In particular, a light source may be activated to provide the light to the reflective surface. Alternatively, light from the sun may provide the light to the reflective surface, and light may be provided by configuring the reflective surface in an area free of obstructions to the sun. In an optional step in block 106, the medium may be disturbed to produce an aesthetically pleasing effect.

Further details and embodiments of the invention will be described by way of the following examples:

EXAMPLE 1

In some embodiments of the apparatus consistent with embodiments of the invention, the apparatus is an active display that allows a static and/or inactive image to become active time and again through disturbance of a liquid medium. In particular, the liquid medium may be water in a reflecting pool that is fifty feet wide, fifty feet long and one foot deep. More particularly, the apparatus may include a light source, such as a electric light source and/or the sun, to provide light to a reflective surface, the reflective surface in turn including an image (e.g., such as a logo, trademark, text, picture, and/or other symbol). At least a portion of the reflective surface, and thus at least a portion of the image, may be disposed in the reflecting pool such that light from the light source is reflected from the reflective surface through the medium to a second surface that captures the reflected light, and thus the image, for display. Disturbance of the water in the reflecting pool is intended to draw the attention of viewers to the image on the second surface and engage them in a uniquely natural way. For example, viewers may interact with and disturb the water of the reflecting pool to introduce disturbances to the image on the second surface or the water may be disturbed through other means, such as through drops of water in the reflecting pool at various time intervals. Advantageously, viewers of the image on the second surface may not treat the image on the second surface as advertising, and thus associate the goodwill with viewing an aesthetically pleasing interactive image with a product associated with that image. Thus, the apparatus provides indirect projection that draws the attention of viewers to engage them in a uniquely natural way.

EXAMPLE 2

In some embodiments of the apparatus consistent with embodiments of the invention, the apparatus may include a three-inch diameter mirror covered with black tape such that a mirror image to that which is desired to be displayed is exposed in the reflective surface of the mirror. Specifically, the mirror image may be a mirror image of the word "LOVE." The mirror may be placed in a container, or base, and the container may be filled with water such that the mirror is approximately one-eighth inch below the surface of the water. The container may then be placed on a horizontal surface against an adjacent second surface with the mirror image of the word "LOVE" inverted relative to a light source capable of producing a narrow beam of light, and the light source may be shone on the mirror at an approximately forty-five angle to the mirror. This causes an image that spells "LOVE" on the second surface. When the water is disturbed the "LOVE" image is disturbed, producing an aesthetically pleasing effect. As the disturbance subsides, settles, or otherwise calms, the "LOVE" image corresponding subsides, settles, or otherwise calms. This, again, produces an aesthetically pleasing and calming effect.

In light of the instant disclosure, it will be appreciated that aspects of the invention may be used to display an image through a medium, and that the medium may be disturbed to produce an aesthetically pleasing effect on the image. It will also be appreciated that aspects of the invention produce an aesthetically pleasing effect as the image returns to a steady state after being disturbed. While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. In particular, any of the blocks of the above flowchart may be deleted, augmented, made to be simultaneous with another, combined, or be otherwise altered in accordance with the principles of the present invention. Accordingly, departures may be made from such details without departing from the scope of applicant's general inventive concept.

Other modifications will be apparent to one of ordinary skill in the art. Therefore, the invention lies in the claims hereinafter appended.

What is claimed is:

1. An apparatus, comprising:
   a reflective surface including a first image disposed upon at least a portion of the reflective surface;
   an agitable and at least semi-transparent medium positioned to cover the reflective surface and the first image;
   a light source positioned to project light on the reflective surface through the medium;
   the first image being adapted to absorb light from the light source incident on the reflective surface to prevent reflection of the absorbed light; and
   a second surface positioned to capture light reflected from the reflective surface through the medium for displaying a second, reflected image, wherein the second, reflected image resembles the first image and is formed by a combination of light reflected from the reflective surface and absence of light that was absorbed at the reflective surface by the first image.

2. The apparatus of claim 1, wherein the medium is a liquid medium.

3. The apparatus of claim 1, wherein the medium is a solid medium.

4. The apparatus of claim 1, wherein the medium is a transparent medium.

5. The apparatus of claim 1, wherein at least a portion of the medium includes a color component.

6. The apparatus of claim 1, wherein the reflective surface is a mirrored surface.

7. The apparatus of claim 1, wherein the first image includes text.

8. The apparatus of claim 1, wherein the first image includes a picture.

9. The apparatus of claim 1, wherein the first image includes a picture.

10. The apparatus of claim 1, wherein at least a portion of the first image includes a color component.

11. The apparatus of claim 1, wherein the light source is positioned above the medium.

12. The apparatus of claim 1, wherein a disturbance of the medium produces an aesthetically pleasing effect on the light reflected from the reflective surface.

13. A method of displaying an image, the method comprising:
    disposing a first image upon at least a portion of a reflective surface;
    positioning at least a portion of a reflective surface including the first image beneath an agitable and semi-transparent medium, the medium covering the first image;
    the first image being adapted to absorb light from the light source incident on the reflective surface to prevent reflection of the absorbed light;
    providing light to the reflective surface such that a second surface captures light reflected from the reflective surface through the medium for displaying a second, reflected image;
    the second, reflected image resembling the first image and being formed by a combination of light reflected from the reflective surface and absence of light that was absorbed at the reflective surface by the first image.

14. The method of claim 13, the method further comprising:
    disturbing the medium to produce an aesthetically pleasing effect on the light reflected from the reflective surface through the medium.

15. The method of claim 13, further comprising:
    adjusting the thickness of the medium to control the duration of a disturbance on the light reflected from the reflective surface through the medium.

16. The method of claim 13, further comprising:
    adjusting the viscosity of the medium to control the duration of a disturbance on the light reflected from the reflective surface through the medium.

17. The method of claim 13, wherein the light is provided by a light source, the method further comprising:
    adjusting the angle of the light source.

18. The method of claim 13, wherein the light is provided by a light source, the method further comprising:
    adjusting the distance of the light source relative to the reflective surface.

19. The method of claim 13, wherein the medium is a liquid medium.

20. The method of claim 13, wherein the medium is a solid medium.

21. The method of claim 13, wherein the first image includes text.

22. The method of claim 13, wherein the first image includes a picture.

23. The method of claim 13, wherein the first image includes a symbol.

24. The method of claim 13, wherein at least a portion of the first image includes a color component.

* * * * *